United States Patent Office 3,266,249
Patented August 16, 1966

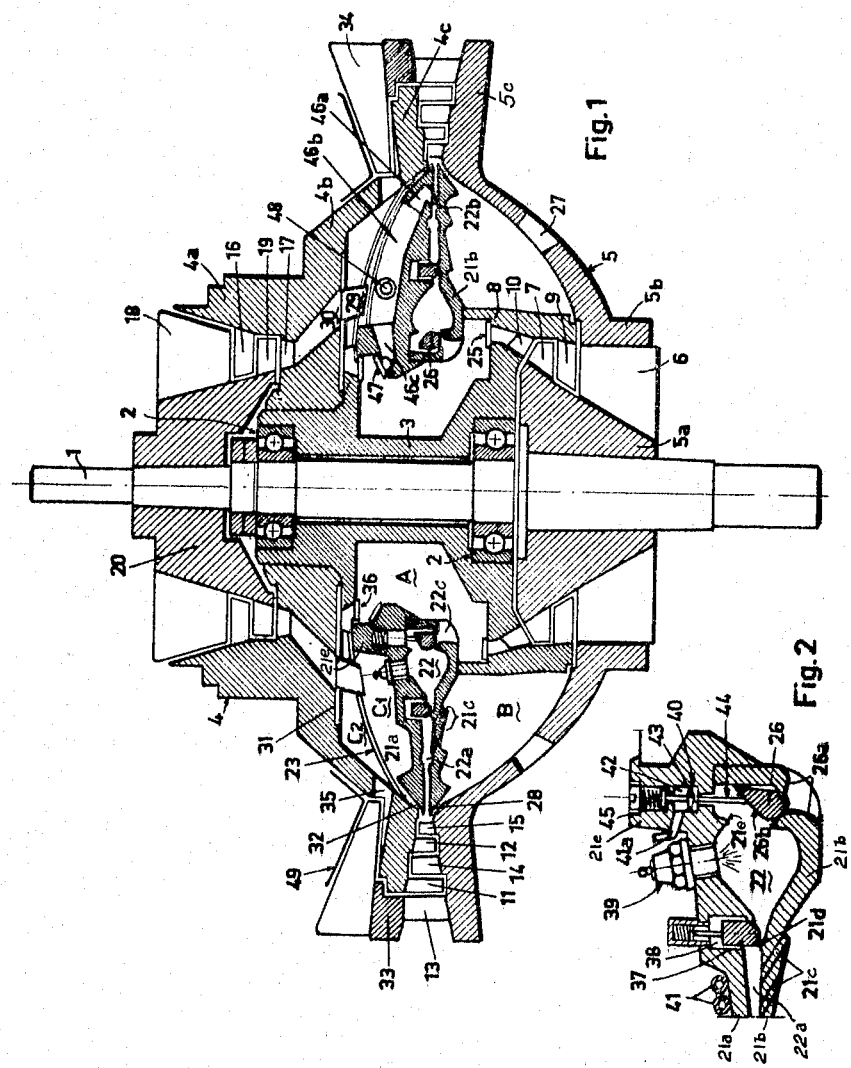

3,266,249
INTERNAL COMBUSTION TURBINE ENGINE
Sergio Simioni, Piazza in Lucina 16, Rome, Italy
Filed Aug. 27, 1963, Ser. No. 304,769
6 Claims. (Cl. 60—39.36)

The present invention relates to the field of internal-combustion turbines, and more particularly to the field of open cycle, constant-volume type gas turbines. Internal-combustion turbines of the constant pressure type are finding increasing application in large sea and air crafts or in military aviation where size and cost do not constitute decisive factors. But the very high engineering and material standards, rendered essential by the extreme mechanical and thermal conditions under which these internal-combustion turbines operate, render their cost prohibitive as a power source for smaller and more economical types of air, sea or land craft.

These limitations, in addition to the high speed level at which their efficiency becomes competitive with conventional reciprocating engines, and their considerable longitudinal dimension has hitherto hindered their installation in the extensive fields of application where initial cost, dimension, long life and efficiency even at the lower speed ranges are of primary importance.

It is an object of my invention to provide an internal-combustion turbine which eliminates these limitations of cost, speed level and dimensions and thus is rendered profitably applicable also to smaller and more economical craft, as well as to a great variety of stationary power plants.

This object is attained by creating a compressor-turbine unit, comprising a generally dish-shaped stationary part or stator containing guide vanes both of the compressor and of the turbine proper, as well as a bearing support of a drive shaft extending through its center, and a similarly dish-shaped rotary part or impeller, containing impeller blades both of the compressor and of the turbine, said impeller being fixed to said drive shaft. Thus, differently from known turbines, in lieu of arranging the compressor and turbine blades on two distinct impellers keyed to a common shaft, in the present invention both the turbine and the compressor blades are fastened to the same impeller, and this is also the case with the compressor and turbine guide vanes. The stator and the rotor face each other with their concave sides so as to define a cavity therebetween. This cavity houses the combustion chambers together with its cooperating elements. This arrangement, in addition to permitting a more compact and space-saving construction, permits other essential advantages, as will be described later.

The inventive object is further attained by providing a combustion chamber and relating elements which are disposed within a plane generally vertical to the turbine shaft and, though based on the known constant-volume, variable-pressure principle, contains novel features, among which are valves of a novel type whose operation is solely and directly controlled by pressure variations within the engine.

Further objects and advantages of my invention will become apparent from the following description of an exemplary embodiment thereof, made with reference to the accompanying drawing, in which:

FIGURE 1 is a sectional view of an internal combustion turbine engine according to my invention, taken along its central axis; and FIGURE 2 is an enlarged partial view of the combustion chamber of the inventive engine and its cooperating elements.

Referring now to the figures, where identical reference numerals represent identical parts, and the indication of locations or directions in the disclosure such as "top," "bottom," "upwards," "downwards," etc. refer to the positions as shown in the figures, not to those which the engine might assume in operation, at 1 is indictaed a shaft revolving in bearings generally indicated at 2, within the bore of a bearing support 3. Support 3 is made integral with a stator of the engine, generally indicated at 4. Said stator 4 consists of a vertically extending, approximately tubular portion 4a, a domed middle portion 4b of a downwardly increasing diameter, and a flat annular flange portion 4c which projects outwardly in a radial plane, the whole forming a stator of an approximately dished shape.

A rotor or impeller, generally indicated at 5, having a shape similar to that of the stator, is keyed, shrunk fitted or otherwise rigidly fastened to shaft 1, with its concave side turned toward the stator, to define with the latter an annular cavity. The bottom portion of impeller 5 consists of a central element 5a, directly fastened to shaft 1, of the shape of an inverted frustum cone and is made integral with an outer, tubular portion 5b by means of a row of impeller blades 6, while a second row of second stage blades 7 projects from the distal portion of the frustum.

A tubular member 8 surrounding the bottom end of support 3, and extending downward beyond it, carries two rows of diffuser vanes 9, 10. Thus, the stationary member 8 and impeller portion 5a form together, with their respective rows of blades 6, 7 and diffuser vanes 9, 10, a main compressor unit. Similarly, the opposite flange portion 4c of the stator and a portion 5c of the impeller carry diffuser vanes 11, 12 and impeller blades 13, 14, 15, respectively, to form a three-stage turbine.

A second compressor unit is formed by the tubular stator portion 4a, from whose internal wall an upper row of diffuser vanes 16 and a bottom row of diffuser vanes 17 project inward, which latter also serves to interconnect stator 4 and support 3, while two rows of blades 18 and 19, fastened to a frustum-shaped body 20 which is rigid with shaft 1, form with said body the impeller part of this compressor.

Within the annular spaces defined by the support 3 and the concave faces of the stator 4 and the impeller 5, there are located correspondingly to the turbine part of the engine, and fastened to suitable stationary components of the same, two flat, annular members 21a and 21b, defining between them cavities which are also annular in their configuration. These cavities consist of a combustion chamber 22 of a cross section which narrows, in a radially outward direction, into a flat space 22a ending, adjacently to blades 15, in a small portion 22b of a still narrower cross section.

The combustion unit formed by members 21a and 21b, and the tubular member 8, divide the space formed between stator 4 and impeller 5 into a number of annular chambers: a compression chamber A formed between the support 3, the upper portion of member 8 and the combustion unit; a chamber B formed between member 8, impeller 5 and member 21b, and a chamber delimited between member 21a, its upright flange portion 21e and the concave face of stator 4. This chamber is divided, by a domed annular plate 23 fastened between the top of flange 21e and the internal face of flange portion 4c, into a lower space $C_1$ and an upper space $C_2$. Chamber A communicates with the discharge end of the main compressor, an annular check valve 25 being interposed at this end to allow a flow from the compressor into chamber A, only but not vice versa. Chamber A also communicates, through an annular passage 22c, with the combustion chamber 22. Here again, an annular check valve 26 permits flow from A to 22 only, but not in the opposite direction.

Chamber B communicates with the exterior through holes 27 in the domed portion of impeller 5. In the sense of rotation of the latter the wall of said holes is preferably so shaped as to draw air from the exterior into said chamber B. This measure is known per se and therefore not described and illustrated. Chamber B further communicates with a narrow, similarly annular passage 28 ending correspondingly at the intake end of the turbine, and, through openings 21c in member 21b, at the cavity 22a.

A circular row of tubes 29, welded or otherwise applied under the corresponding perforations of an annular plate 31 closing off a discharge chamber 30 of the upper or auxiliary compressor, extends into chamber $C_1$, which communicates through a narrow, annular passage 32 with the intake end of the turbine.

The free ends of turbine blades 13 carry a ring 33, welded or otherwise fixed to them, which ring carries a row of compressor blades 34, which discharge, through guide vanes 35, chamber $C_2$ and an annular check valve 36, additional air into chamber A to increase the air pressure in it. As shown in greater detail in FIG. 2, the combustion chamber 22 is separated from the nozzle portion 22a by an interposed annular valve 37 which is vertically movable within a similarly annular guide slot 38 formed in 21a. The lower, rounded part of valve 37 is spring biased against a projecting valve seat 21d. Member 21a also contains a number of spark plugs 39 spaced apart along the wall of 21a and a number of carburetors, generally indicated at 40, connected by means of a serpentine 41 to a non represented fuel tank. The serpentine is preferably disposed so as to hug the walls of the combustion chamber, in order to attain preheating of the fuel.

The carburetors 40 consist in a vertical cylindrical cavity 42 formed within the thickness of flange 21e in alignment with valve 26. Within the cavity 42 is slidable a piston 43, rigidly connected by a piston rod 44 to valve 26. A spring 45 biases piston 43 downward and thus also valve 26 against its seat 26a.

At a number of points equally distributed within the nozzle portion 22a, a deflecting duct 46a is formed within the body of member 21a. This duct 46a continues in a channel 46b, issuing in a passage 46c, and leading back into the compression chamber A. An annular check valve 47 permits fluid flow only in the direction from the duct 46 into the chamber A, and not in the reverse direction. A further check valve 48 in the wall of duct 46b and opening towards its interior permits fluid flow only in the direction from chamber $C_1$, within which the duct is located, into said duct.

An annular plate 49 which is fastened to portion 4b and projects outward from it, forms the upper wall of the space within which the impeller blades 34 of the lateral compressor move.

The operation of the engine is as follows: once it has been started by any of a number of known means, and the first explosion has occurred in the combustion chamber, the rotation of the blades 6 and 7 of the lower or main compressor forces air into chamber A. Additional air is fed into this chamber by vanes 34 through chamber $C_2$. Simultaneously a part of the exhaust gases is deflected from the nozzle 22b into ducts 46a, b, c and presses the air contained in them into chamber A, creating there a further increase in pressure. These combined pressures lift valve 26 from its seat 26a, overcoming the force of spring 45, and the compressed air flows from chamber A into chamber 22. The concave surface 26b of valve 26, in the uppermost position of valve 26, approaches a projection 21e to form a narrow passage.

Simultaneously, piston 43 has been lifted beyond the orifice of the fuel passage 41a. The air flowing into chamber 22, together with the vacuum created there by the previous explosion, sucks fuel from 41a into the chamber and atomizes it, owing to the pitot effect obtained by the narrow passage left between 26b and 21c in the lifted position of valve 26 during this intake phase. Once the pressure difference between chambers 22 and A has decreased sufficiently to permit spring 45 to press valve 26 back onto valve seat 26a, the fuel-air mixture is ignited by spark plug 39.

The ignition cycle may be directly timed by the descending movement of valve 26. Valve 26 has a top surface 26b of a larger area than the piston, so that the downward pressure exerted upon it by the explosion, added to the downward bias of spring 45, surpasses the pressure on the lower surface of said piston. Thus, the explosion cannot lift check valve 26 from its seat, but opens valve 37, overcoming the action of its spring, and thereby the combustion gases expand into the flat space 22a, to be discharged, through nozzle 22b, radially outward against the turbine blades and vanes 11–15, thus causing the impeller 5 and its shaft 1 to rotate. The return of valve 37 against its seat 21d causes a certain vacuum to be retained in chamber 22 after the explosion, this vacuum being, as already mentioned, advantageous during the intake phase.

The rotation of impeller 5 also causes air to be drawn, through holes 27, into chamber B. The pitot effect created by the jet of combustion gases on the passages 21c in the member 21b and on passage 28, causes air from said chamber B to be entrained both into the space 22a where its oxygen mixes with the burning high-temperature combustion gases to increase the efficiency of the jet, and to be drawn into passage 28, mix with the jet issuing from the nozzle 22b to cool said jet. This latter action is assisted by the air which from the top compressor is fed into chamber $C_1$ and thence is entrained by the jet towards the turbine blades and vanes. However, the cooling action of the air pressed into chamber $C_1$ by the top compressor continues also when, during the intake phase in the combustion chamber 22, no jet issues through nozzle 22b.

From the aforegoing description is clearly results that the initially mentioned objects are realized by my invention. All valves are actuated and their motion timed by the periodical pressure variations within the combustion chamber 22, compression chamber A and ducts 46a, b, c, and require no extra and costly control gear. The described arrangement of the combustion organs within the space defined between stator and impeller results in an extremely compact unit.

In addition, the positioning of the turbine blades and vanes further away from the engine axis than the axial compressors leads to the result that the turbine operates with an advantageous torque arm, larger than that of the two axial flow compressors. In addition the intermittency of the jet issuing from the nozzle mouth as well as the continuous flow of cooling air creates less severe thermal conditions in the turbine blades than in the constant-pressure turbines, so that cheaper alloys may be used for them. These conditions are further improved by admitting, through passage 28, secondary air from chamber B to reduce the gas temperature after 22b. The concomitant reduction of jet temperature and speed improves the turbine efficiency.

The turbine may be installed advantageously in land, air and sea craft, with its shaft in a vertical position, and shows satisfactory performance also in lower speed ranges. However, it is capable of operating in any position, if all valves are made spring loaded and guided in any known suitable manner.

The present internal-combustion turbine engine has been tested with a variety of liquid and gaseous fuels, such as liquid and gaseous hydrocarbon, e.g. methane, butane, acetylene, and various gasolines. Hydrocarbons of higher density may be employed by using a diesel-type injection pump and nozzle.

What I claim is:
1. An internal-combustion turbine engine comprising
   (I) stator means including
       (a) axially disposed compressor guide vanes, and
       (b) radially disposed turbine guide vanes;

(II) axially directed impeller means including
   (a) compressor impeller blades forming, together with said compressor guide vanes, an axial-flow compressor, and
   (b) turbine impeller blades forming, together with said turbine guide vanes, a radial-flow turbine;
(III) said stator means and said impeller means defining therebetween a space essentially consisting of
   (a) an air compression chamber communicating at one location through a check valve with the discharge side of said compressor, at a second location through an additional check valve with an annular combustion chamber, and a third location through another check valve with ducts conducting air from further compressors and other combustion gases into said compression chamber, and of
   (b) nozzle means formed by a portion of said combustion chamber for discharging the combustion gases into said radial-flow turbine.

2. An internal-combustion turbine engine comprising
(I) a generally dish-shaped stator member consisting of
   (a) a tubular portion,
   (b) an outwardly tapering middle portion, and
   (c) a radially outwardly extending flange portion containing spaced-apart coaxial rows of compressor guide vanes;
(II) a bearing support rigid with said stator member and including bearings;
(III) a tubular member, rigid with said bearing support and said stator member, and including axially extending rows of radially inwardly projecting compressor guide vanes;
(IV) a generally dish-shaped impeller member, rigidly fastened to a driving shaft, the concave side of said impeller member facing the concave side of said stator member, said tubular portion of the stator member being coaxial with said driving shaft, and said impeller member consisting of
   (a) a cylindrical portion, having a concentric annular cavity which houses, in an axially extending succession, rows of impeller blades, which form an axial-flow compressor, with said guide vanes on said tubular member,
   (b) an outwardly and upwardly extending middle portion having a circular row of through holes,
   (c) a radially outwardly extending flange portion carrying in a radially spaced relationship concentric rows of impeller blades, which form a radial-flow turbine having a torque arm larger than that of said axial-flow compressor, with said guide vanes on said flange portion of the stator member;
(V) said bearing support and said impeller member defining therebetween a cavity which contains
   (a) an annular compression chamber communicating on one side with the discharge of said compressor and on the other side with an annular intake passage,
   (b) an annular, radially disposed combustion chamber, rigid with stationary members of the engine and communicating with a radially outwardly directed nozzle portion ending in front of the inlet end of the turbine; said compression chamber communicating with said combustion chamber through said intake passage;
   (c) an annular chamber defined between the internal face of said middle portion of the impeller member, the wall of said combustion chamber facing it and said tubular member; said annular chamber drawing, during the rotation of said impeller member, external air through said row of holes in said middle portion to supply said air to said inlet end and, through conformed passages in the nozzle wall, to said nozzle portion of the combustion chamber;
   (d) an annular check valve for controlling said intake passage, and opening toward said combustion chamber; and
   (e) an annular valve interposed between said combustion chamber and said nozzle portion, and being movable in axial direction.

3. An internal-combustion turbine engine according to claim 2, additionally comprising a second impeller member fastened to said shaft opposite to said first-named impeller member, the blades of said second impeller member forming a compressor for blowing cooling air upon the blades of the turbine, in cooperation with said guide vanes on said flange portion of the stator member.

4. An internal-combustion turbine engine according to claim 3, additionally comprising a ring fastened upon the outer row of said turbine blades, on which in turn is fastened a row of compressor blades blowing additional air into said compression chamber through an annular passage.

5. An internal-combustion turbine engine according to claim 4, wherein said combustion chamber consists of two flat annular members, each fastened to stationary parts of the engine, and defining between them
   (a) an annular combustion chamber proper, and
   (b) a narrow space extending radially outwardly from said combustion chamber proper and ending, in front of said inlet end, in an annular nozzle mouth portion, said combustion chamber proper communicating with said narrow annular space; and additionally comprising an annular, movable, spring-loaded valve interposed between said combustion chamber proper and said narrow annular space, to open under a pressure increase in said combustion chamber proper.

6. An internal-combustion turbine engine according to claim 5, wherein part of the exhaust gases passing through said nozzle portion are diverted back into a passage opening, through a check valve, into said compression chamber, to press the air contained within said passage into said compression chamber to increase the pressure therein, to lift said check valve at the intake of said combustion chamber from its seat to allow compressed air to flow into said combustion chamber and entrain pulverized fuel into the latter.

References Cited by the Examiner

UNITED STATES PATENTS 2,850,250   9/1958   Smith _____ 60—39.37 X

MARK NEWMAN, *Primary Examiner.*

RALPH D. BLAKESLEE, *Examiner.*